Patented Feb. 8, 1949

2,461,155

UNITED STATES PATENT OFFICE 2,461,155

NAPHTHOIC ACID SOLDERING FLUX

Thomas Alton Hale, Rochester, N. Y., assignor to Eastman Kodak Company, Rochester, N. Y., a corporation of New Jersey No Drawing. Application July 31, 1945, Serial No. 608,081

5 Claims. (Cl. 148—25)

This invention relates to soldering fluxes and more particularly to a soldering flux which is completely non-corrosive and electrically non-conductive.

In the final assembly of electronic equipment such as radio, radar, sound detectors, fire control, etc. in which solder is employed to join together very small parts such as fine wires, contacts, etc., it is extremely important that the residue of any soldering flux used should be not only completely non-corrosive and electrically non-conductive but also that any fumes from the flux during the soldering operation should be equally harmless to all of the parts with which they may come into contact.

While rosin has been known as a universal soldering flux and can qualify in all three of the respects recited above, the fluxing (pickling) action of the rosin is slow and frequently results in a bond which is not so strong as would be produced by a more active flux.

It is, therefore, an object of my invention to provide a soldering flux which is completely non-corrosive and electrically non-conductive and which flux at the same time will produce a strong soldered bond between two parts made of different metals or between two parts made of the same metal.

I have found that alpha naphthoic acid, beta naphthoic acid, alpha naphthoic acid anhydride and beta naphthoic acid anhydride, each fulfills these requirements admirably. Each of these acids has the empirical formula $C_{10}H_7COOH$ and each of these anhydrides has the empirical formula $(C_{10}H_7CO)_2O$. Each of these acids and anhydrides has a melting point below or not much above the melting point of the usual soldering alloy, is substantially insoluble in water at room temperatures but is soluble in alcohol. Thus, these acids and anhydrides will flow readily at soldering temperatures, protect the soldered joint against moisture penetration, do not decompose at soldering temperatures nor hydrolyze in the presence of moisture but can be removed from the soldered joint by the use of alcohol if it is desired. In addition, each produces a very strong jointure or bond between two pieces of different metals which are being soldered or between two pieces of the same metal, such as copper, tin, lead, silver, and various alloys thereof. As is well known, the usual solder is an alloy of lead and tin; however, my invention is useful not only with the usual solder but with special solders such as others of the fusible alloy class.

Since the naphthoic acids and anhydrides are solid at atmospheric temperatures, they do not spread well over the area being soldered until they are heated to their respective melting points; hence they are more useful as a soldering flux if mixed with other suitable components.

Since rosin makes a good protective coating for any soldered joint and is completely non-corrosive and electrically non-conductive and is compatible with the naphthoic acids and anhydrides, I have found that even a more useful soldering flux can be produced by dissolving rosin and alpha or beta naphthoic acid or alpha or beta naphthoic acid anhydride together by means of a high boiling common solvent such as cyclohexanol, butyl alcohol or similar suitable high boiling solvent. A more or less high boiling solvent is preferable depending upon the consistency desired for the final product, but the product may be made up originally or may be thinned by the use of terpentine or methyl, ethyl, or isopropyl alcohol. By making into a heavy paste, the flux may be included in the core of hollow wire solder in the same form that straight rosin flux has heretofore been used.

A typical flux in accordance with my invention may be compounded as follows:

| | Parts by weight |
|---|---|
| Alpha or beta naphthoic acid | 1 |
| Rosin W. W. | 1 |
| Cyclohexanol | 3 |

A somewhat more liquid flux embodying my invention may be compounded as follows:

| | Parts by weight |
|---|---|
| Alpha or beta naphthoic acid | 1 |
| Rosin W. W. | 3 |
| Cyclohexanol | 6 |

A still more liquid form of flux embodying my invention may be compounded by adding one part of methyl, ethyl, or isopropyl alcohol to either of the formulae above recited.

Alpha or beta naphthoic acid anhydride may be substituted in the same proportions for the corresponding acid in either of the above formulae with substantially equal efficacy. Also, a mixture of alpha and beta naphthoic acids or a mixture of alpha and beta naphthoic acid anhydrides, or a mixture of one or both of these acids with one or both of these anhydrides, may be substituted in the same proportions for the acid in either of the above formulae with substantially equal efficacy.

In using the flux of my invention it will be found that excessive heat is not required or even desired to form a strongly bonded jointure of the solder with the metallic parts being joined, that the flux is completely non-corrosive even under accelerated (warm, humid) corrosive conditions, and that the flux is also electrically non-conductive and that no fumes are formed during the soldering operation which will corrode the parts or cause electrical conduction where it is not desired.

I claim:

1. A non-corrosive and electrically non-conductive soldering flux consisting of equal parts by weight of rosin and a compound selected from the group consisting of alpha naphthoic acid, beta naphthoic acid, alpha naphthoic acid anhydride and beta naphthoic acid anhydride, dissolved in a common solvent.

2. A non-corrosive and electrically non-conductive soldering flux consisting of equal parts by weight of rosin and a compound selected from the group consisting of alpha naphthoic acid, beta naphthoic acid, alpha naphthoic acid anhydride and beta naphthoic acid anhydride, dissolved in a high boiling common solvent.

3. A non-corrosive and electrically non-conductive soldering flux consisting of from 1 to 3 parts by weight of rosin and 1 part by weight of a compound selected from the group consisting of alpha naphthoic acid, beta naphthoic acid, alpha naphthoic acid anhydride and beta naphthoic acid anhydride, dissolved in a common solvent.

4. A non-corrosive and electrically non-conductive soldering flux consisting of from 1 to 3 parts by weight of rosin and 1 part by weight of a compound selected from the group consisting of alpha naphthoic acid, beta naphthoic acid, alpha naphthoic acid anhydride and beta naphthoic acid anhydride, dissolved in a high boiling common solvent.

5. A non-corrosive and electrically non-conductive soldering flux consisting of from 1 to 3 parts by weight of rosin and 1 part by weight of a compound selected from the group consisting of alpha naphthoic acid, beta naphthoic acid, alpha naphthoic acid anhydride and beta naphthoic acid anhydride, dissolved in 3 to 6 parts by weight of cyclohexanol.

THOMAS ALTON HALE.

REFERENCES CITED

The following references are of record in the file of this patent:

UNITED STATES PATENTS

| Number | Name | Date |
| --- | --- | --- |
| 1,859,651 | Powers | May 24, 1932 |
| 2,361,867 | Pessel | Oct. 31, 1944 |

FOREIGN PATENTS

| Number | Country | Date |
| --- | --- | --- |
| 471,202 | Great Britain | Aug. 31, 1937 |

OTHER REFERENCES

"Handbook of Chemistry and Physics," 26th edition (1942); published by Chemical Rubber Publishing Company, Cleveland, Ohio; pages 628–629, 858–859, and 892–893.